US012177955B2

(12) United States Patent
Garg et al.

(10) Patent No.: US 12,177,955 B2
(45) Date of Patent: Dec. 24, 2024

(54) HIGH FLOW CAVITY VENTILATION

(71) Applicant: WHIRLPOOL CORPORATION, Benton Harbor, MI (US)

(72) Inventors: Ankur Garg, Pune (IN); Dhiraj J. Gotekar, Pune (IN); Ashish Sharadrao Kadam, Pune (IN); Xiangxu Liu, Shenzhen (CN)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 631 days.

(21) Appl. No.: 17/498,502

(22) Filed: Oct. 11, 2021

(65) Prior Publication Data

US 2023/0115327 A1 Apr. 13, 2023

(51) Int. Cl.
*H05B 6/64* (2006.01)

(52) U.S. Cl.
CPC .................................. *H05B 6/642* (2013.01)

(58) Field of Classification Search
CPC .... H05B 6/6402; H05B 6/6411; H05B 6/642; H05B 6/6423; H05B 6/6429; H05B 6/645; H05B 6/6458; H05B 6/6485; F24C 15/006; F24C 15/101; F24C 15/20; F24C 15/2007; F24C 15/2014; F24C 15/2035; F24C 15/2042; F24C 15/325; F24C 15/327
See application file for complete search history.

(56) References Cited

U.S. PATENT DOCUMENTS

| | | | | | |
|---|---|---|---|---|---|
| 4,131,779 | A * | 12/1978 | Tatsukawa | H05B 6/645 219/757 |
| 5,015,812 | A | 5/1991 | Kasai et al. | |
| 6,528,774 | B2 | 3/2003 | Lee | |
| 7,193,195 | B2 | 3/2007 | Undstrom et al. | |
| 8,294,070 | B2 * | 10/2012 | McNamee | F24C 15/325 219/684 |
| 8,539,941 | B2 * | 9/2013 | Iwamoto | F24C 15/006 219/757 |
| 8,851,061 | B2 * | 10/2014 | Johnson | F24C 15/2007 219/757 |

(Continued)

FOREIGN PATENT DOCUMENTS

| | | | |
|---|---|---|---|
| EP | 1640666 | A1 | 3/2006 |
| EP | 1580488 | B1 | 6/2009 |

(Continued)

*Primary Examiner* — Hung D Nguyen
(74) *Attorney, Agent, or Firm* — BROOKS KUSHMAN P.C.

(57) ABSTRACT

A ventilation system for an oven is provided. A side duct assembly includes a substantially vertical exit duct portion adjacent to an oven cavity wrapper defining an oven cavity of the oven, the substantially vertical exit duct portion having an air intake configured to receive a cavity air flow from an air intake along a side of a cavity wrapper. The side duct assembly further includes an angled duct portion defining an air passage angled upwards and towards a rear of the oven, the angled duct portion having an input end configured to receive the cavity air flow from the top of the substantially vertical exit duct portion and an output end configured to provide the cavity air flow into a mixing zone at the rear of the oven for mixing the cavity air flow with an electronics air flow from oven electronics into a combined air flow.

19 Claims, 6 Drawing Sheets

(56) References Cited

U.S. PATENT DOCUMENTS

| | | | | |
|---|---|---|---|---|
| 9,879,866 | B2 | 1/2018 | Suenaga et al. | |
| 2005/0127070 | A1* | 6/2005 | Kang | H05B 6/6429 219/757 |
| 2006/0191925 | A1* | 8/2006 | Iwamoto | A47B 77/08 219/757 |
| 2010/0200577 | A1* | 8/2010 | Iwamoto | H05B 6/6429 219/757 |
| 2012/0043318 | A1* | 2/2012 | Komuro | F24C 15/327 219/757 |
| 2013/0153571 | A1 | 6/2013 | Asami et al. | |
| 2013/0248523 | A1* | 9/2013 | Kim | H05B 6/6402 219/757 |
| 2015/0305095 | A1* | 10/2015 | Huang | H05B 6/6423 219/757 |
| 2016/0165672 | A1* | 6/2016 | Imm | H05B 6/6423 219/757 |
| 2016/0165675 | A1* | 6/2016 | Imm | F24C 15/006 219/757 |
| 2016/0381741 | A1* | 12/2016 | Lee | F24C 15/2035 219/757 |

FOREIGN PATENT DOCUMENTS

| | | | |
|---|---|---|---|
| KR | 20040059039 | | 7/2004 |
| KR | 100766023 | B1 | 10/2007 |
| KR | 20080008140 | A | 1/2008 |
| KR | 101627379 | B | 6/2011 |

* cited by examiner

HIGH FLOW CAVITY VENTILATION

TECHNICAL FIELD

Aspects of the disclosure relate to an improved oven cavity ventilation system having improved air flow.

BACKGROUND

Heat is generated by the magnetron and other components of a microwave oven. To cool these components, the oven draws in cool air and blows that air over the components. The oven may also blow air through the oven cavity to carry away heat and smells produced within the oven cavity. The oven cavity air flow also allows for condensation to be carried away and out of the oven.

SUMMARY

In one or more illustrative examples, a ventilation system for an oven is provided. A side duct assembly includes a substantially vertical exit duct portion adjacent to an oven cavity wrapper defining an oven cavity of the oven, the substantially vertical exit duct portion having an air intake configured to receive a cavity air flow from an air intake along a side of a cavity wrapper. The side duct assembly further includes an angled duct portion defining an air passage angled upwards and towards a rear of the oven, the angled duct portion having an input end configured to receive the cavity air flow from the top of the substantially vertical exit duct portion and an output end configured to provide the cavity air flow into a mixing zone at the rear of the oven for mixing the cavity air flow with an electronics air flow from oven electronics into a combined air flow.

In some examples, the ventilation system further includes a rear duct assembly including vertical walls defining a vertical air flow path along the back of the oven, the rear duct assembly having a first opening configured to receive the output end of the angled duct portion of the side duct assembly and a second opening configured to receive the electronics air flow from a top air duct.

In some examples, the ventilation system further includes a channel extending from the bottom rear of the oven to a bottom front of the oven, the channel configured to receive the combined air flow from the rear duct assembly to be exhausted out the front of the oven.

In some examples, the ventilation system further includes a separator plate defining a top surface above the first opening of the angled duct portion into the mixing zone and sides that extend vertically downward within the mixing zone to delineate a heat transfer chamber within the mixing zone, the bottom of the heat transfer chamber being open to allow the cavity air flow to pass out, wherein the separator plate extends vertically downward within the rear duct assembly for a portion of a height of the oven until the mixing zone at the rear of the oven into which the cavity and electronics air flows combine into the combined air flow.

In some examples, the ventilation system further includes a fan configured to drive the electronics air to draw heat away from the oven electronics, wherein the cavity air flow is encouraged out of the oven cavity due to the electronics air flow pulling air downward through the mixing zone.

In some examples, the oven electronics includes one or more of a magnetron, a transformer, a capacitor, and an electronics board. In some examples, the oven electronics air intake defines one or more openings for receiving air into the substantially vertical exit duct portion from the cavity that are sized to guard the substantially vertical exit duct portion from receiving food or utensils placed into the oven cavity.

In one or more illustrative examples, a ventilating oven is provided. The oven includes oven electronics and an oven cavity wrapper, having an access opening and walls at the top, left side, right side, back, and bottom. The oven further includes a side duct assembly having a substantially vertical exit duct portion adjacent to an oven cavity of the oven and having an air intake configured to receive a cavity air flow from an air intake in one of the sides of the oven cavity wrapper. The side duct assembly further has an angled duct portion defining an air passage angled upwards and towards a rear of the oven, the angled duct portion having an input end configured to receive the cavity air flow from the top of the substantially vertical exit duct portion and an output end configured to provide the cavity air flow into a mixing zone at the rear of the oven for mixing the cavity air flow with an electronics air flow from the oven electronics into a combined air flow.

In some examples, the ventilating oven further includes a rear duct assembly including vertical walls defining a vertical air flow path along the back of the oven, the rear duct assembly having a first opening configured to receive the output end of the angled duct portion of the side duct assembly and a second opening configured to receive the electronics air flow from a top air duct.

In some examples, the ventilating oven further includes a channel extending from the bottom rear of the oven to a bottom front of the oven, the channel configured to receive the combined air flow from the rear duct assembly to be exhausted out the front of the oven.

In some examples, the ventilating oven further includes a separator plate defining a top surface above the first opening of the angled duct portion into the mixing zone and sides that extend vertically downward within the mixing zone to delineate a heat transfer chamber within the mixing zone, the bottom of the heat transfer chamber being open to allow the cavity air flow to pass out, wherein the separator plate extends vertically downward within the rear duct assembly for a portion of a height of the oven until the mixing zone at the rear of the oven into which the cavity and electronics air flows combine into the combined air flow.

In some examples, the ventilating oven further includes a fan configured to drive the electronics air to draw heat away from the oven electronics, wherein the cavity air flow is encouraged out of the oven cavity due to the electronics air flow pulling air downward through the mixing zone.

In some examples, the oven electronics includes one or more of a magnetron, a transformer, a capacitor, and an electronics board. In some examples, the air intake defines one or more openings for receiving air into the substantially vertical exit duct portion from the cavity that are sized to guard the substantially vertical exit duct portion from receiving food or utensils placed into the oven cavity.

In one or more illustrative examples, a method for ventilating an oven is provided. A cavity air flow is received, into a side duct assembly having a substantially vertical exit duct portion adjacent to an oven cavity of the oven, from an air intake in one of the sides of the oven cavity wrapper. The cavity air flow is received from the top of the substantially vertical exit duct portion into an angled duct portion defining an air passage angled upwards and towards a rear of the oven. The cavity air flow is provided from an output end of the angled duct portion into a mixing zone at the rear of the oven for mixing the cavity air flow with an electronics air flow from the oven electronics into a combined air flow.

In some examples, the method includes forced convection heat transfer between the cavity air flow and the electronics air flow being performed via a separator plate, the separator plate defining a top surface above an opening of the angled duct portion into the mixing zone and sides that extend vertically downward within the mixing zone to delineate a heat transfer chamber within the mixing zone, the bottom of the heat transfer chamber being open to allow the cavity air flow to pass out.

In some examples, the separator plate extends vertically downward within the mixing zone for a portion of a height of the oven until the mixing zone at the rear of the oven, and the method includes combining the cavity air flow and the electronics air flow into the combined air flow as the cavity air flow exits the heat transfer chamber into the mixing zone.

In some examples, the combined air flow is received into a channel extending from the rear of the oven to a bottom front of the oven, and the combined air flow is exhausted out a front vent of the oven. In some examples, a fan is utilized to drive the electronics air flow to draw heat away from the oven electronics.

DETAILED DESCRIPTION

Figure 1:
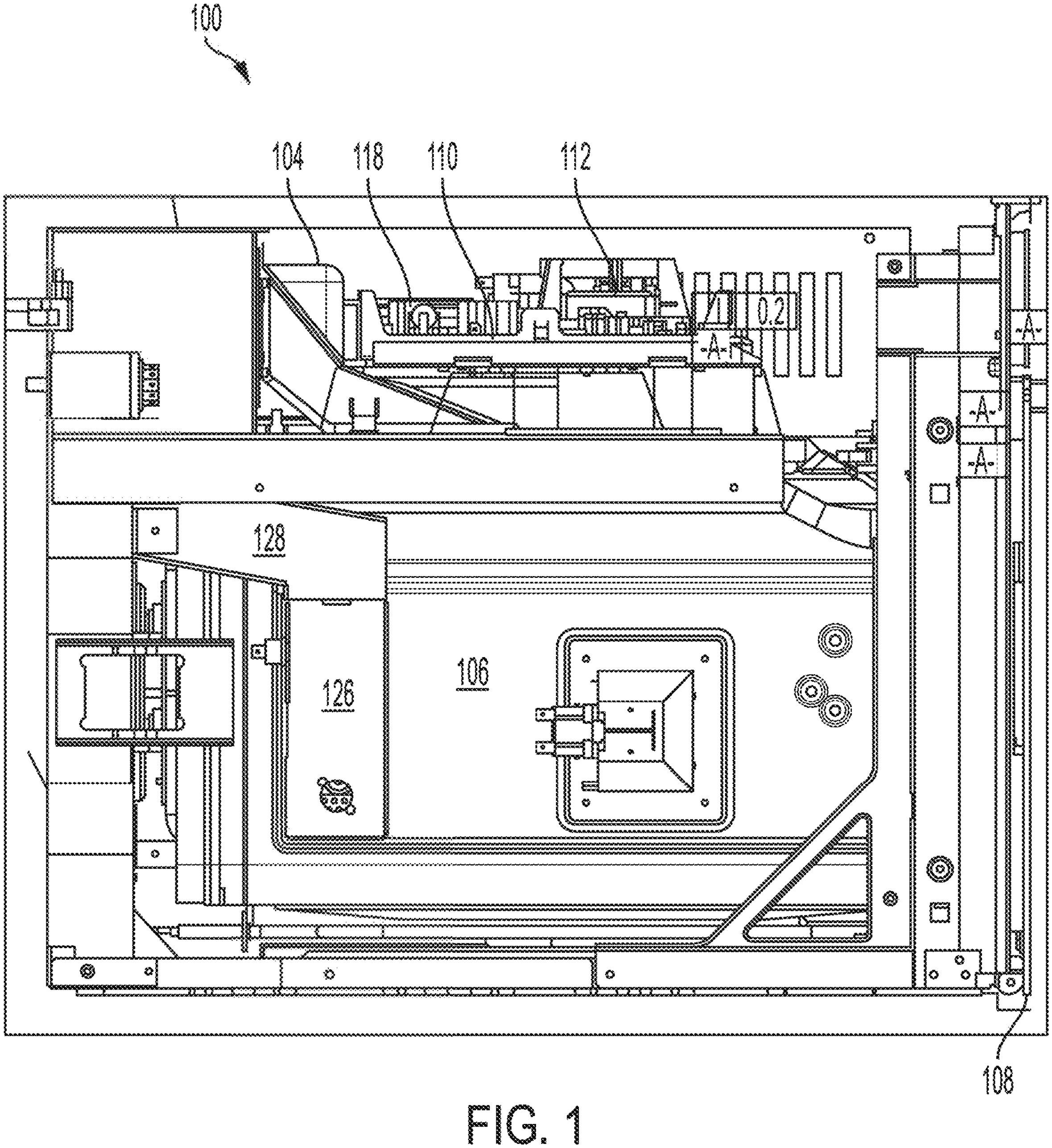
FIG. 1 is a side cutaway view of the microwave oven, in accordance with one or more embodiments of the disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Ovens employ ventilation systems to relieve the heat generated by the magnetron and other oven components. Ventilation systems are also used to extract excess moisture from the oven cavity. Such systems typically include one or more fans to promote air flow and channels to guide the air flow from the oven to the external environment. The efficiency of such systems depends in part on the quantity of bends in the ventilation channels, as each bend may increase turbulence and reduce air flow pressure. Moreover, the cost of such systems may increase with part count.

As described in detail herein, an improved cavity ventilation system for a microwave oven is described. The ventilation system mixes a main ventilation air flow from the top of the oven with a cavity exhaust air flow received from the side of the oven cavity into an opening at the upper side of the cavity back. The combined airflow then flushes down a vertical flow path along the back of the oven and towards the front of the oven. This design provides for an improved cavity exhaust flow with a minimum of bends, allowing for both ease of manufacture and lower system air resistance with a streamlined vertical flow. Further aspects of the ventilation system are described in detail herein.

FIGS. 1-5 collectively illustrate aspects of an oven 100 implementing an improved ventilation system. In general, the oven 100 may cook food placed into an oven cavity 102 by exposing the food to electromagnetic radiation in the microwave frequency range. This radiation is produced by a magnetron 104, where electrons are emitted from a hot cathode to resonant cavities of the anode at speeds that generate the microwave energy.

The oven 100 includes a cavity wrapper 106 that defines an access opening and walls at the top, left side, right side, back and bottom. A door 108 may be arranged at a front of the oven cavity 102 to selectively cover the access opening. The door 108 may operate to move between an open position where the oven cavity 102 is accessible via the access opening and a closed position where the door 108 seals the opening. The cavity wrapper 106 may be made of a material such as stainless steel or ceramic enamel, to prevent the passage of the radiation outside of the oven cavity 102. The door 108 may include a clear window for observing the food, shielded by a metal mesh to prevent the passage of the radiation.

To perform a cooking cycle, the food is placed in the oven cavity 102, the door 108 is closed, and the magnetron 104 is activated. During operation, microwave energy travels from the magnetron 104 through a waveguide 110 and is distributed into the oven cavity 102 via a mode stirrer 112. The microwave energy transfers to the food via dielectric heating. Once the food is heated, the magnetron 104 is deactivated, the door 108 is reopened, and the food is removed. The oven 100 may also include a door switch (not shown) that detects whether the door 108 is open or closed, such that the magnetron 104 is automatically deactivated should the door 108 be opened during a cooking cycle.

The magnetron 104 may be driven by electrical components that provide a high voltage source, such as a transformer and capacitor (in other examples a switching power supply may be used). The oven 100 may also include an electronics board 118 to control the operation of the other components of the oven 100. During operation of the oven 100, these electrical components of the oven 100 (e.g., the magnetron 104, transformer, capacitor, and electronics board 118) produce waste heat. To remove this heat, the oven 100 may include a fan 120 driving an air flow into a top air duct 122 to draw this heat away from the electrical components. This electronics air flow is illustrated herein as air flow (A).

Additionally, because the oven 100 operates by heating water molecules, the cooking process tends to generate steam. This steam may condense on the cooler inside surfaces of the oven cavity 102. This condensation may be more prevalent when cooking foods of high moisture content for extended periods of time. In these instances, the condensation may be especially noticeable to the user. Thus, in addition to cooling the magnetron 104, an oven cavity 102 air flow may be used to carry away the condensation, as well as providing an air flow circulation into the oven cavity 102 (e.g., for condensation management, odor reduction, heat management, etc.). This oven cavity 102 air flow is illustrated herein as air flow (B).

Figure 3:
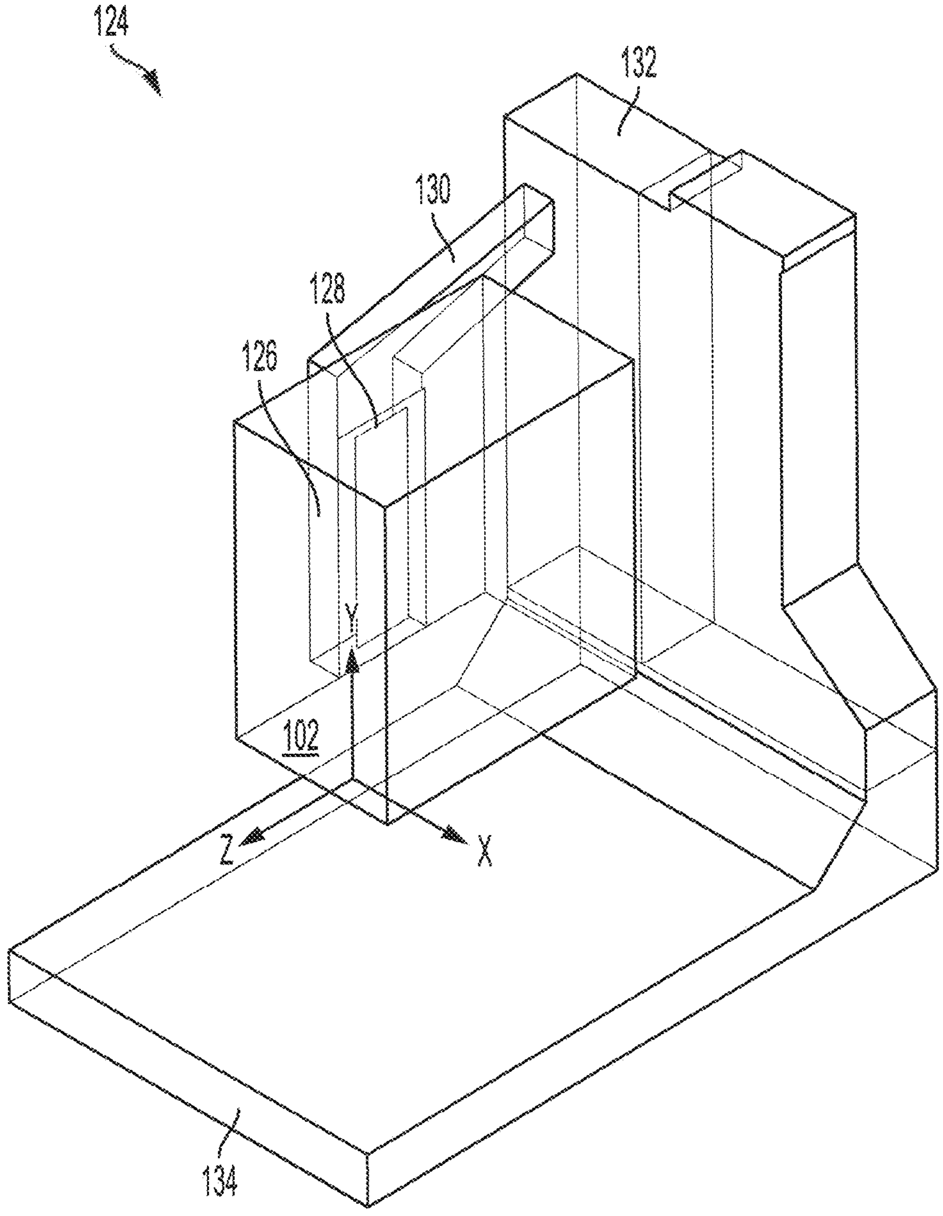
FIG. 3 is a perspective view of components of the side duct assembly of the microwave oven, in accordance with one or more embodiments of the disclosure.

As best seen in FIG. 3, a side duct assembly 124 may be provided to receive and direct the oven cavity 102 air flow (B) out of the oven cavity 102. The side duct assembly 124 may include a substantially vertical exit duct 126 having an air intake 128 configured to receive the air flow (B) from the side of the oven cavity 102. The air intake 128 may define one or more openings for receiving air into the exit duct 126 from the oven cavity 102 but sized to guard the exit duct 126 from also receiving food or utensils that may be placed into the oven cavity 102.

The side duct assembly 124 may further include an angled duct portion 130 defining an air passage angled upwards and rearwards into an upper end of a rear mixing chamber 132 behind the oven cavity 102. The side duct assembly 124 may be operatively connected to the top of the exit duct 126 to receive the air flow (B) from the top end of the vertical exit duct 126 and to direct the airflow (B) into the rear mixing chamber 132 with a minimum of bends or turbulence. Moreover, as the angled duct portion 130 receives the airflow from the top of the exit duct 126 and continues the upward flow, the tendency for warm air to rise may aid in the movement of air out of the oven cavity 102.

The rear mixing chamber 132 may include vertical walls extended rearward from a back plate of the oven cavity 102 defining a vertical air flow path along the rear of the oven 100. The vertical walls, along with the rear face of the back plate 131 collectively define a vertical channel extending the vertical height of the oven 100. While not shown, the exterior shell of the oven 100 or another plate may complete the enclosure of the back face of the vertical air flow path. The rear mixing chamber 132 may extend vertically along the height of the rear of the oven 100 and may open into a bottom duct 134 defined below the oven cavity 102 and extending along the bottom of the oven 100. The bottom duct 134 may include an exhaust port (not shown) at the bottom front of the oven 100 to allow air to flow out the bottom front of the oven 100.

Figure 2:
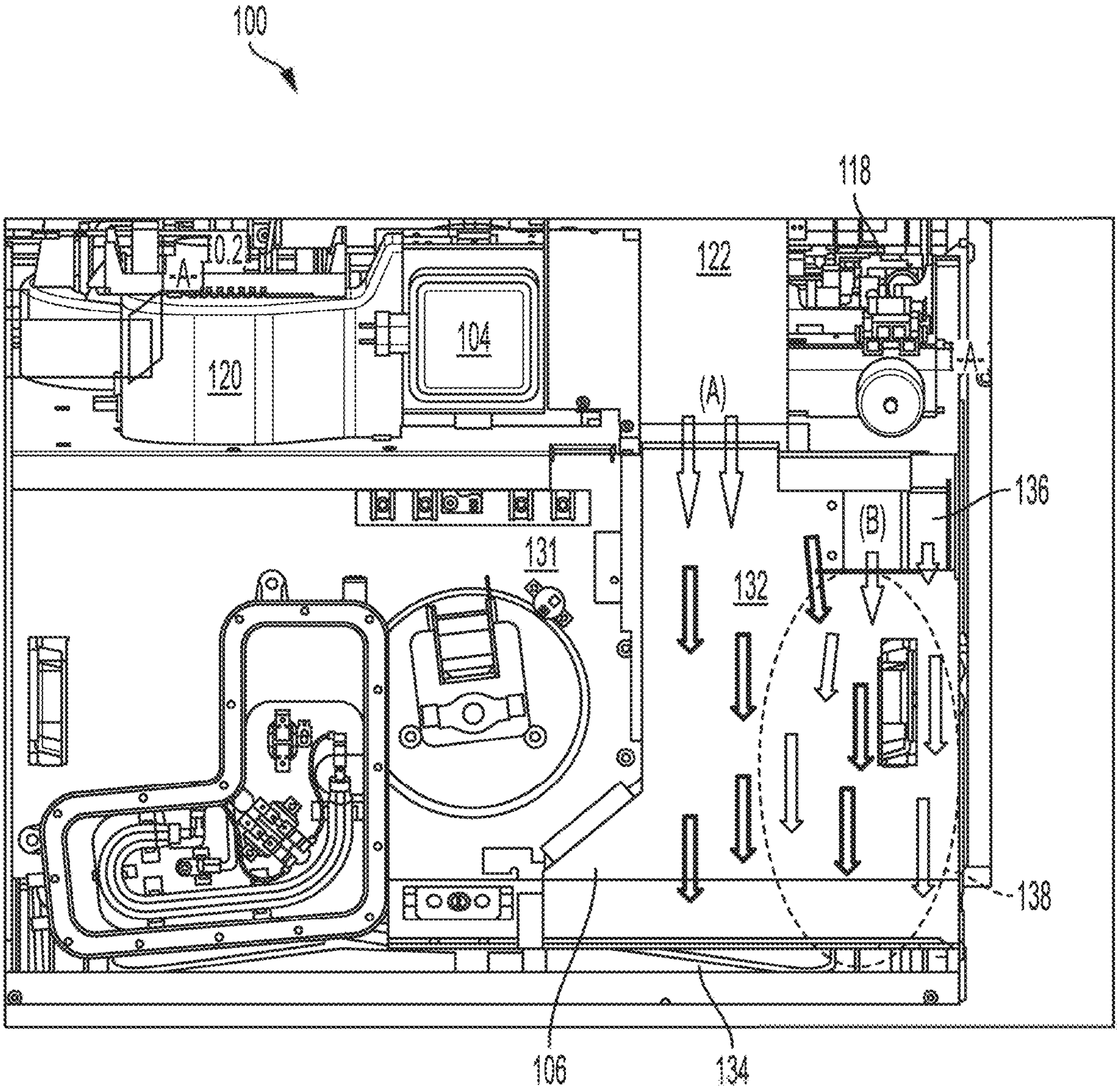
FIG. 2 is a rear cutaway view of the microwave oven, in accordance with one or more embodiments of the disclosure.

As most clearly shown in FIG. 2, the back plate 131 of the oven cavity 102 may define an opening 136 configured to receive the output end of the angled duct portion 130. A mixing zone 138 may therefore be defined by the rear mixing chamber 132 below the opening 136 and before the bottom of the oven 100. The mixing zone 138 allows for the combination of the air flows (A) and (B) to occur at the rear of the oven 100, before the air flows (A) and (B) reach the bottom of the oven 100.

During operation of the oven 100, the fan 120 may be activated to force air into top air duct 122. This air flow (A) may pass over the magnetron 104, transformer, capacitor, and/or other electrical components of the oven 100 to relieve the heat generated by those components. The rear mixing chamber 132 may receive the air flow (A) having passed over components into the upper end of the rear mixing chamber 132.

Additionally, during operation of the oven 100, the rear mixing chamber 132 may receive the air flow (B) exiting the angled duct portion 130 into an upper end of the rear mixing chamber 132. In some examples, the air flow (B) may passively flow into the side duct assembly 124 from the oven cavity 102 due to heated air rising as a result of cooking operations taking place in the oven cavity 102. This air flow (B) out of the oven cavity 102 may also be encouraged due to the air flow (A) pulling air downward through the rear mixing chamber 132. In other example, the fan 120 (or another fan) may provide fresh air into the oven cavity 102 which may force the air flow (B) to enter into the air intake 128 of the side duct assembly 124.

In the mixing zone 138, the cavity air flow (B) and the main air flow (A) combine to form a combined air flow. The combined air flow then passes towards the bottom of the oven 100 and through the bottom duct 134 to the bottom front of the oven 100. The combined air flow may then exhaust out of the bottom duct 134 of the oven 100 via front vents (not shown).

Figure 4:
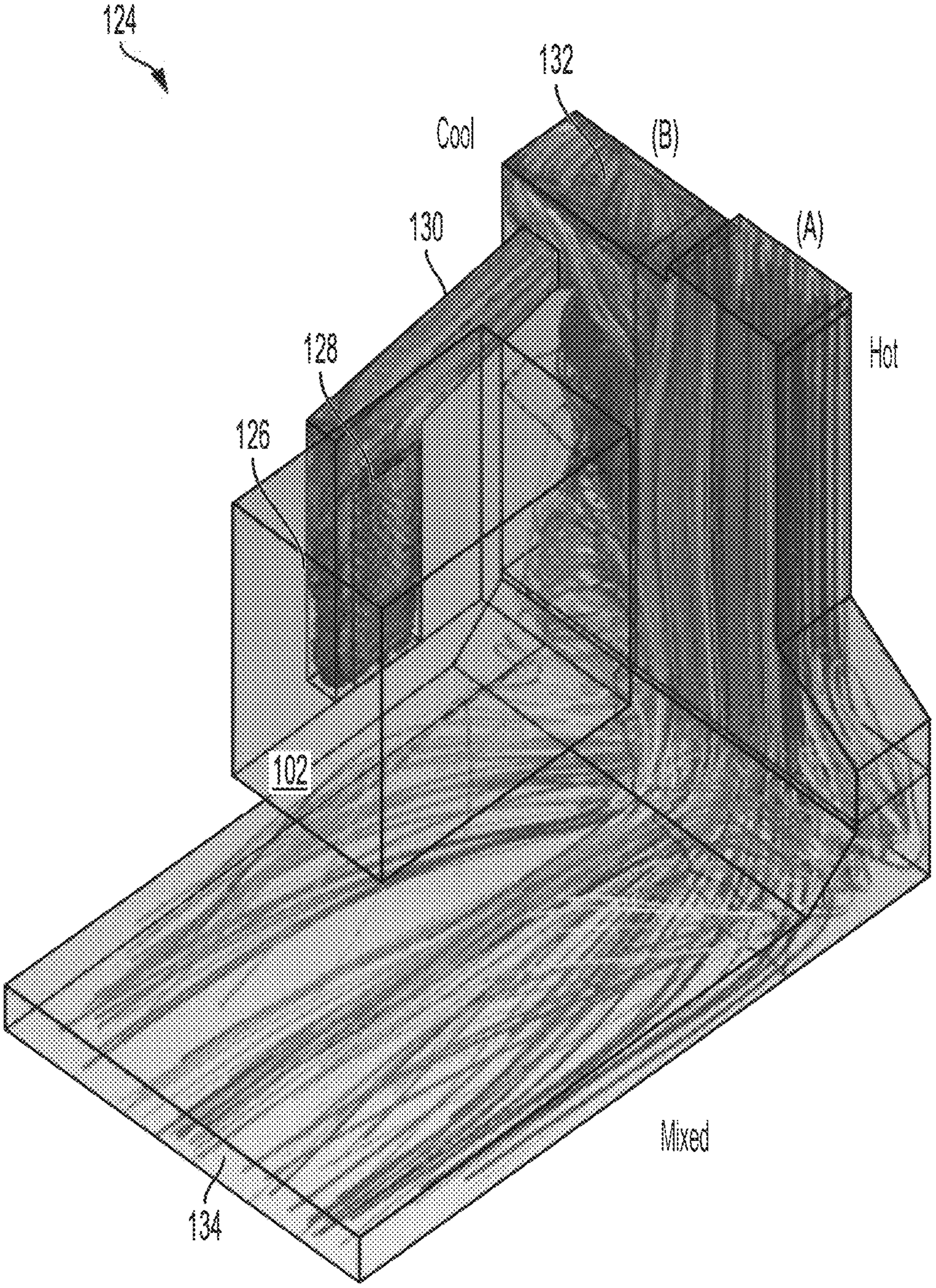
FIG. 4 is a perspective view of components of the side duct assembly illustrating the magnetron and cavity air flows, in accordance with one or more embodiments of the disclosure.
Figure 5:
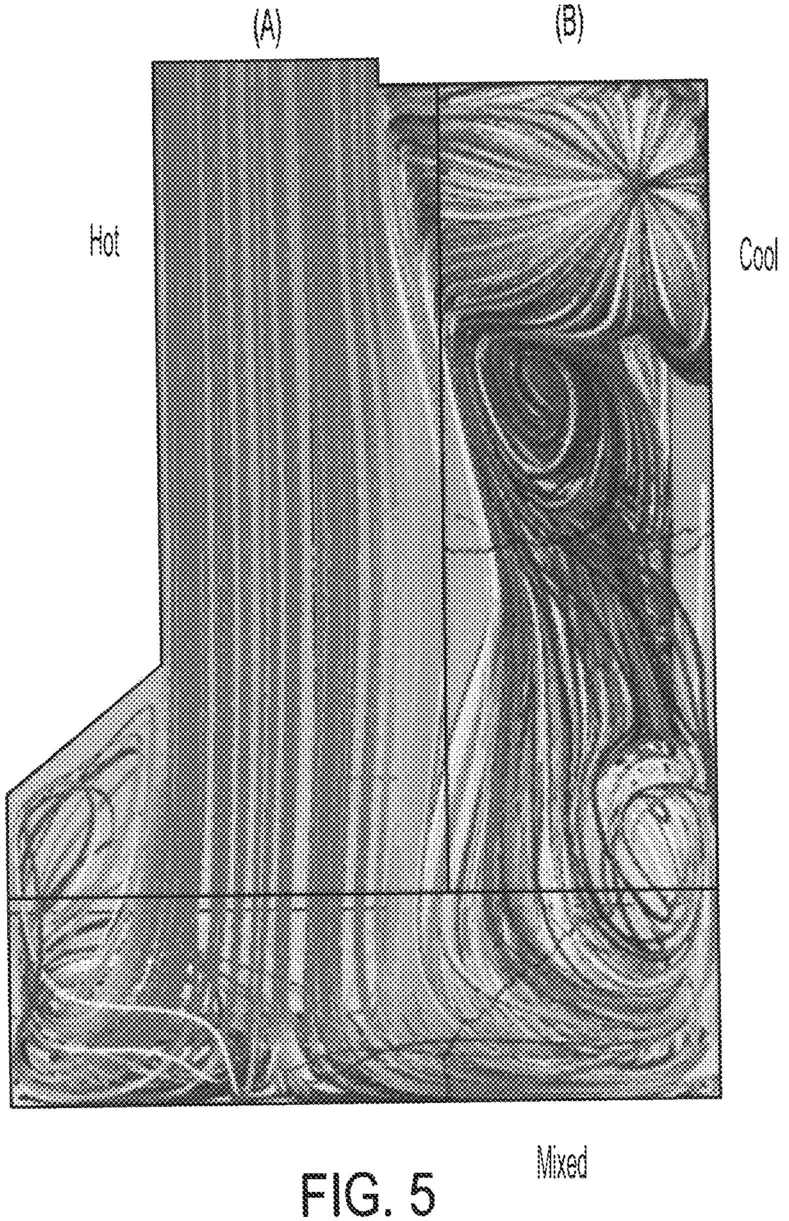
FIG. 5 is a rear view of components of the side duct assembly illustrating the magnetron and cavity air flows, in accordance with one or more embodiments of the disclosure.

FIG. 4 is a perspective view of components of the side duct assembly 124 illustrating the electronics air flow (A) and the cavity air flow (B). FIG. 5 is a rear view of the same example. As can be seen, the air flow (A) received into the rear mixing chamber 132 via the top air duct 122 may be of a higher temperature than the air flow (B) received into the rear mixing chamber 132 via the side duct assembly 124. However, it can further be seen that the airflow entering the bottom duct 134 has mixed the air flows (A) and (B) in the mixing zone 138, resulting in a more equalized temperature of airflow traversing the rear mixing chamber 132 and out the front vents.

Figure 6:
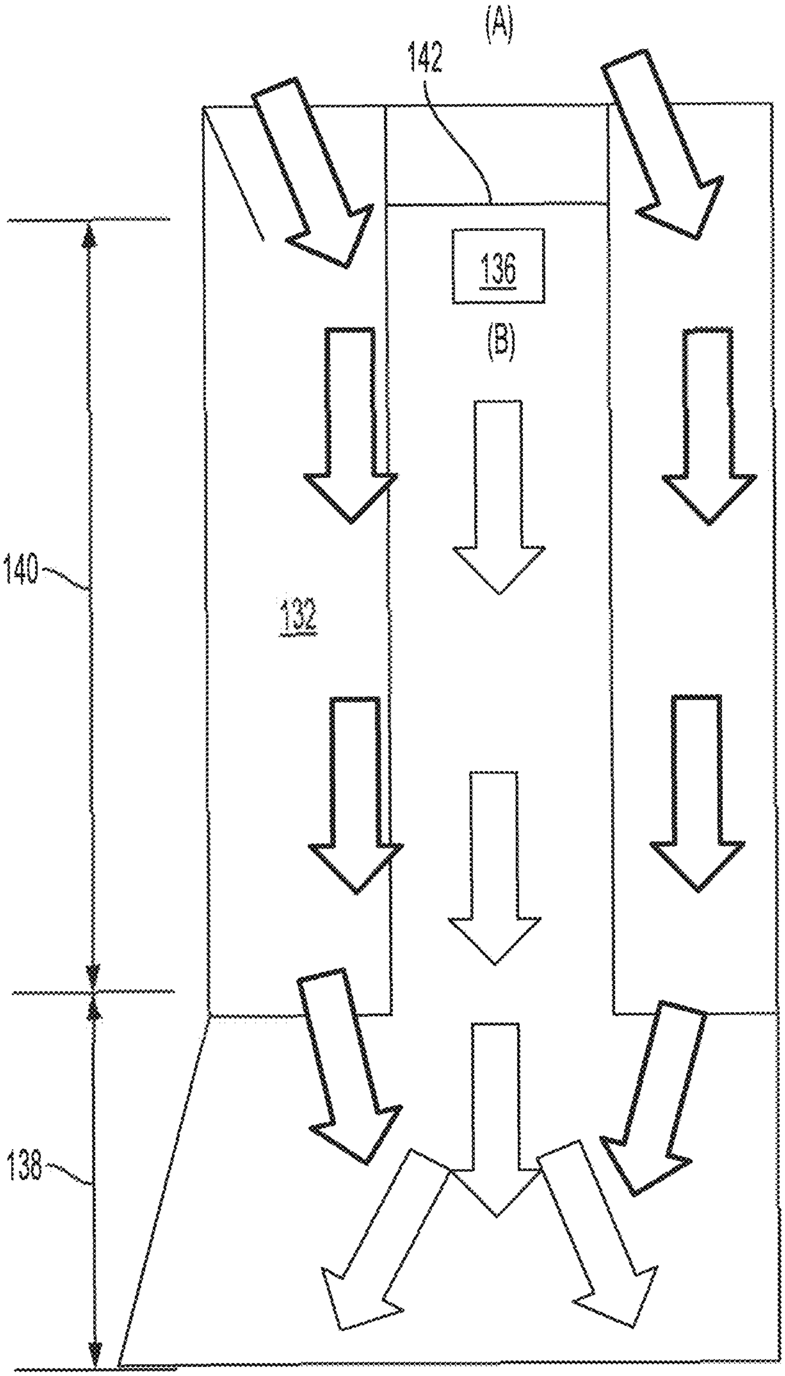
FIG. 6 is a rear view of a cutaway of the microwave oven illustrating another example embodiment including a heat transfer zone in addition to a mixing zone.

FIG. 6 is a rear view of a cutaway of the microwave oven 100 illustrating another embodiment, similar to that of FIGS. 1-5, including a heat transfer zone 140 in addition to the mixing zone 138. As shown, a U-shaped separator plate 142 may define a top surface, above the opening 136 of the angled duct portion 130 into the rear mixing chamber 132. The separator plate 142 may further define sides that extend vertically downward within the rear mixing chamber 132 to delineate a heat transfer chamber 144 within the rear mixing chamber 132. The bottom of the heat transfer chamber 144 may be open to allow the air flow (B) to pass down and out into the mixing zone 138.

During operation of the oven 100, in the heat transfer zone 140 the separator plate 142 may serve to maintain physical separation of the parallel air flows (A) and (B) until the mixing zone 138. Yet, the separator plate 142 may still allow for heat transfer via forced convection between the air flow (B) traversing downward in the heat transfer chamber 144 and the parallel air flow (A) traversing downward in the rear mixing chamber 132 outside the heat transfer chamber 144. To facilitate the convection, the separator plate 142 may be formed of sheet metal or another heat-conductive material.

Thus, the disclosed approach mixes a main ventilation air flow from the top of the oven 100 with a cavity exhaust air flow received from the side of the oven cavity 102 into an opening 136 at the upper side of the cavity back. The combined airflow then flushes down a vertical flow path along the back of the oven 100 and then towards the front of the oven 100. This design provides for an improved cavity exhaust flow with a minimum of bends, allowing for both case of manufacture and lower system air resistance with a streamlined vertical flow.

Variations on the disclosed approach are possible. For example, while many examples herein discuss a main ventilation air flow from the top of the oven 100 downwards, it is contemplated that in other examples oven electronics may be placed at the bottom of the oven 100, and the main ventilation air flow and cavity air flows may traverse up the vertical flow path along the back of the oven 100 and then towards the front top of the oven 100.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A ventilation system for an oven, comprising:

a side duct assembly, including a substantially vertical exit duct portion adjacent to an oven cavity wrapper, the oven cavity wrapper defining an oven cavity of the oven, the substantially vertical exit duct portion having an air intake configured to receive a cavity air flow from the air intake along a side of the cavity wrapper, and an angled duct portion defining an air passage angled upwards and towards a rear of the oven, the angled duct portion having an input end configured to receive the cavity air flow from the top of the substantially vertical exit duct portion and an output end configured to provide the cavity air flow into a mixing zone at the rear of the oven for mixing the cavity air flow with an electronics air flow from oven electronics into a combined air flow.

2. The ventilation system of claim 1, further comprising a rear duct assembly including vertical walls defining a vertical air flow path along the back of the oven, the rear duct assembly having a first opening configured to receive the output end of the angled duct portion of the side duct assembly and a second opening configured to receive the electronics air flow from a top air duct.

3. The ventilation system of claim 2, further comprising a channel extending from the bottom rear of the oven to a bottom front of the oven, the channel configured to receive the combined air flow from the rear duct assembly to be exhausted out the front of the oven.

4. The ventilation system of claim 2, further comprising a separator plate defining a top surface above the first opening of the angled duct portion into the mixing zone and sides that extend vertically downward within the mixing zone to delineate a heat transfer chamber within the mixing zone, the bottom of the heat transfer chamber being open to allow the cavity air flow to pass out, wherein the separator plate extends vertically downward within the rear duct assembly for a portion of a height of the oven until the mixing zone at the rear of the oven into which the cavity and electronics air flows combine into the combined air flow.

5. The ventilation system of claim 1, further comprising a fan configured to drive the electronics air to draw heat away from the oven electronics, wherein the cavity air flow is encouraged out of the oven cavity due to the electronics air flow pulling air downward through the mixing zone.

6. The ventilation system of claim 1, wherein the oven electronics includes one or more of a magnetron, a transformer, a capacitor, and an electronics board.

7. The ventilation system of claim 1, wherein the air intake defines one or more openings for receiving air into the substantially vertical exit duct portion from the cavity that are sized to guard the substantially vertical exit duct portion from receiving food or utensils placed into the oven cavity.

8. A ventilating oven, comprising:

oven electronics;

an oven cavity wrapper, having an access opening and walls at the top, left side, right side, back, and bottom; and a side duct assembly, having a substantially vertical exit duct portion adjacent to an oven cavity of the oven and having an air intake configured to receive a cavity air flow from one of the sides of the oven cavity wrapper, and an angled duct portion defining an air passage angled upwards and towards a rear of the oven, the angled duct portion having an input end configured to receive the cavity air flow from the top of the substantially vertical exit duct portion and an output end configured to provide the cavity air flow into a mixing zone at the rear of the oven for mixing the cavity air flow with an electronics air flow from the oven electronics into a combined air flow.

9. The ventilating oven of claim 8, further comprising a rear duct assembly including vertical walls defining a vertical air flow path along the back of the oven, the rear duct assembly having a first opening configured to receive the output end of the angled duct portion of the side duct assembly and a second opening configured to receive the electronics air flow from a top air duct.

10. The ventilating oven of claim 9, further comprising a channel extending from the bottom rear of the oven to a bottom front of the oven, the channel configured to receive the combined air flow from the rear duct assembly to be exhausted out the front of the oven.

11. The ventilating oven of claim 9, further comprising a separator plate defining a top surface above the first opening of the angled duct portion into the mixing zone and sides that extend vertically downward within the mixing zone to delineate a heat transfer chamber within the mixing zone, the bottom of the heat transfer chamber being open to allow the cavity air flow to pass out, wherein the separator plate extends vertically downward within the rear duct assembly for a portion of a height of the oven until the mixing zone at the rear of the oven into which the cavity and electronics air flows combine into the combined air flow.

12. The ventilating oven of claim 8, further comprising a fan configured to drive the electronics air to draw heat away from the oven electronics, wherein the cavity air flow is encouraged out of the oven cavity due to the electronics air flow pulling air downward through the mixing zone.

13. The ventilating oven of claim 8, wherein the oven electronics includes one or more of a magnetron, a transformer, a capacitor, and an electronics board.

14. The ventilating oven of claim 8, wherein the air intake defines one or more openings for receiving air into the substantially vertical exit duct portion from the cavity that are sized to guard the substantially vertical exit duct portion from receiving food or utensils placed into the oven cavity.

15. A method for ventilating an oven, comprising:

receiving, into a side duct assembly having a substantially vertical exit duct portion adjacent to an oven cavity of the oven, a cavity air flow from an air intake in one of the sides of an oven cavity wrapper defining the oven cavity;

receiving the cavity air flow from the top of the substantially vertical exit duct portion into an angled duct portion defining an air passage angled upwards and towards a rear of the oven; and providing the cavity air flow from an output end of the angled duct portion into a mixing zone at the rear of the oven for mixing the cavity air flow with an electronics air flow cooling oven electronics into a combined air flow.

16. The method of claim 15, further comprising:

performing forced convection heat transfer between the cavity air flow and the electronics air flow via a separator plate, the separator plate defining a top surface above an opening of the angled duct portion into the mixing zone and sides that extend vertically downward within the mixing zone to delineate a heat transfer chamber within the mixing zone, the bottom of the heat transfer chamber being open to allow the cavity air flow to pass out.

17. The method of claim 16, wherein the separator plate extends vertically downward within the mixing zone for a portion of a height of the oven until the mixing zone at the rear of the oven, and further comprising combining the cavity air flow and the electronics air flow into the combined air flow as the cavity air flow exits the heat transfer chamber into the mixing zone.

18. The method of claim 17, further comprising:

receiving the combined air flow into a channel extending from the rear of the oven to a bottom front of the oven; and exhausting the combined air flow out a front vent of the oven.

19. The method of claim 15, further comprising utilizing a fan to drive the electronics air flow to draw heat away from the oven electronics.

* * * * *